United States Patent [19]

Astor

[11] Patent Number: 5,779,406
[45] Date of Patent: Jul. 14, 1998

[54] FORMING A NONUNIFORM GROOVE IN AN ANNULAR BORE WALL

[75] Inventor: John Joseph Astor, Bradford, Pa.

[73] Assignee: Dresser Industries, Inc., Dallas, Tex.

[21] Appl. No.: 682,438

[22] Filed: Jul. 17, 1996

[51] Int. Cl.$^6$ .................................................. B23C 3/00
[52] U.S. Cl. .................. 409/132; 29/888.02; 409/143; 409/165; 409/199
[58] Field of Search .................. 409/131, 132, 409/143, 165, 166, 168, 198, 199, 221; 29/888.02, 888.024

[56] References Cited

U.S. PATENT DOCUMENTS

| | | |
|---|---|---|
| Re. 34,155 | 1/1993 | Link . |
| 2,372,913 | 4/1945 | Schmidt ..................... 409/143 |
| 3,811,163 | 5/1974 | Frederick et al. ........... 409/132 |
| 4,028,992 | 6/1977 | Kuehnle ..................... 409/132 |
| 4,141,279 | 2/1979 | Abel et al. . |
| 4,181,466 | 1/1980 | Owen . |
| 4,354,404 | 10/1982 | Ramusino . |
| 4,400,859 | 8/1983 | Woythal et al. ............. 409/143 |
| 4,642,861 | 2/1987 | Riley et al. . |
| 4,742,739 | 5/1988 | Yamaguchi et al. . |
| 4,923,342 | 5/1990 | Kopkie et al. . |
| 4,929,131 | 5/1990 | Allemann ................... 409/132 |
| 4,932,288 | 6/1990 | James, Sr. . |
| 5,094,573 | 3/1992 | Hougen ...................... 409/132 |
| 5,184,927 | 2/1993 | Judy ........................... 409/143 |
| 5,193,952 | 3/1993 | Tomoo et al. . |
| 5,197,361 | 3/1993 | Carrier et al. . |
| 5,402,569 | 4/1995 | Maki et al. ................. 29/888.02 |

*Primary Examiner*—Daniel W. Howell
*Attorney, Agent, or Firm*—Haynes and Boone, L.L.P.

[57] ABSTRACT

A method of producing an annular nonuniform groove (106) in the bore wall (104) of a casing (100) and a casing produced thereby is disclosed. The method includes the steps of forming a first portion (164), forming a second portion (172), and forming a third portion of an annular nonuniform groove. The first portion is formed by a first milling tool (168). The first portion defines a starting point (108) as the radial furthest point on the radially outer surface of the first portion. The first portion also defines a first intermediate point (166) as the radially closest point on the radial outer surface of the first portion. The second portion (172) is formed by a second milling tool (174, 180). The second portion is defined along the annular radial outer side wall from the first intermediate point to a second intermediate point (178). The second intermediate point (178) is defined as the radial closest point on the annular radially outer side wall of the second portion. The third portion (196) is formed by a third milling tool (194). The third portion (196) extends along the annular radial outer side wall of the annular nonuniform groove from the second intermediate point (178) to an ending point (110).

24 Claims, 6 Drawing Sheets

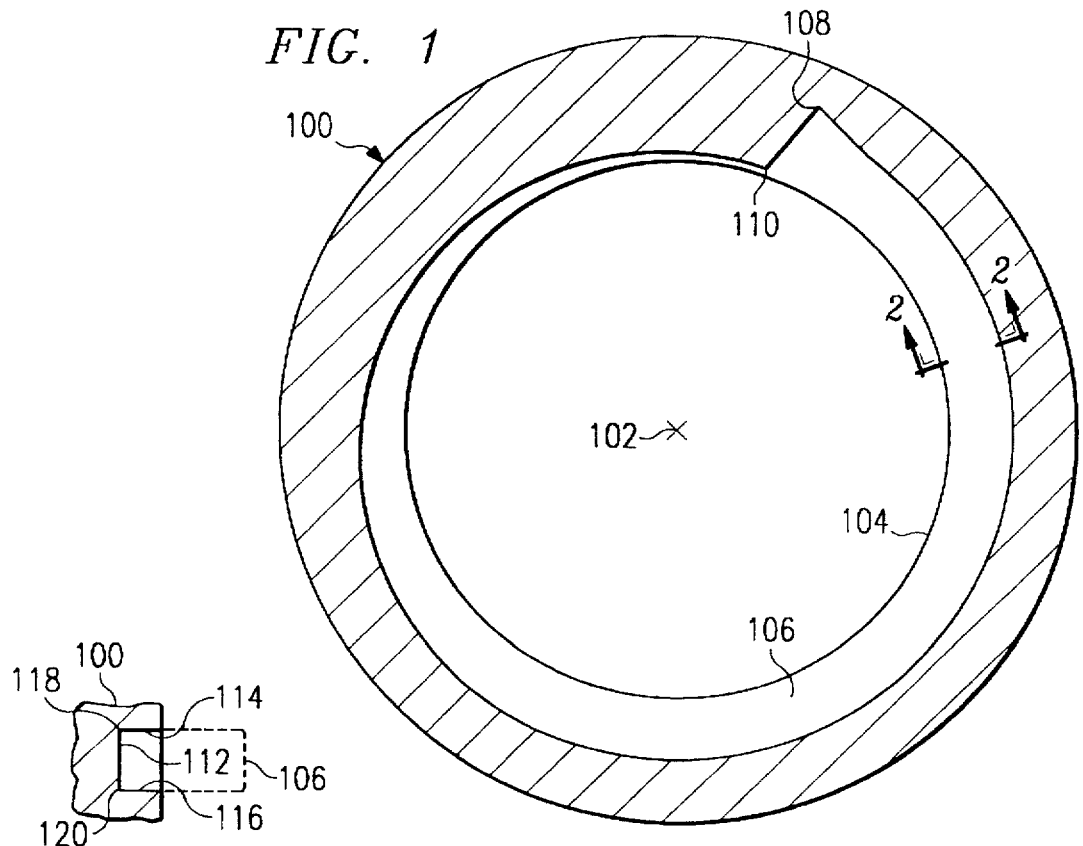
FIG. 1
FIG. 2
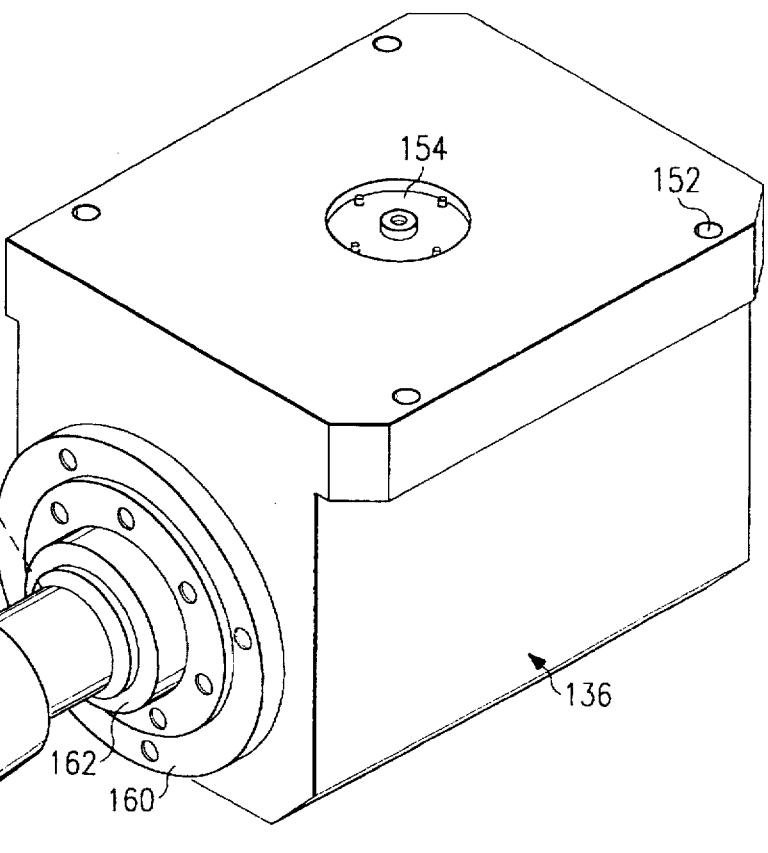
FIG. 4

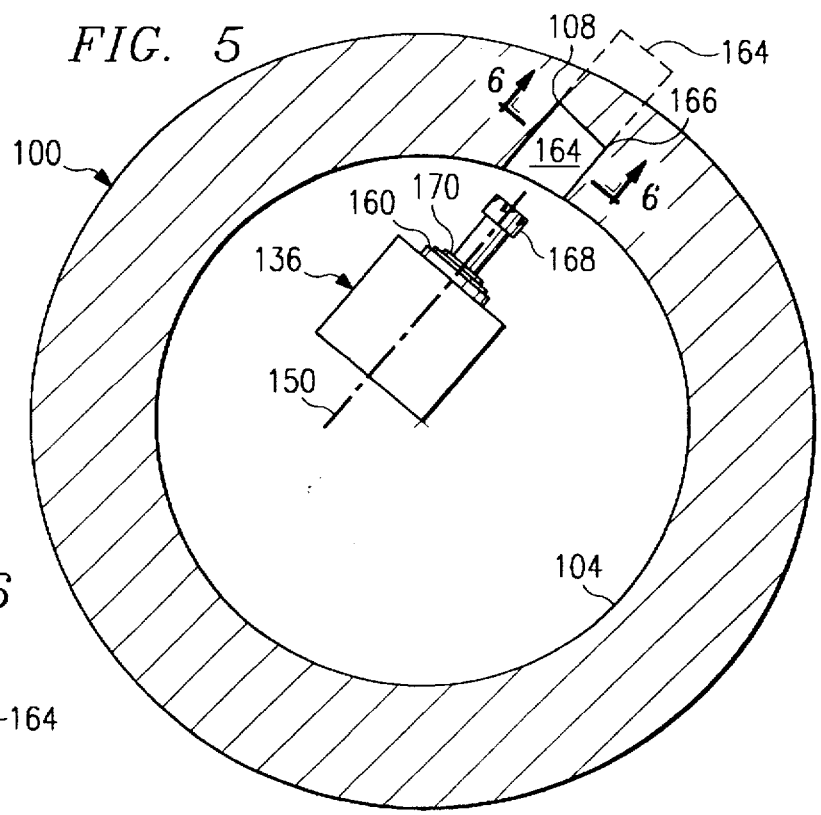
FIG. 5
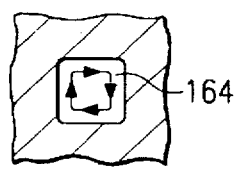
FIG. 6
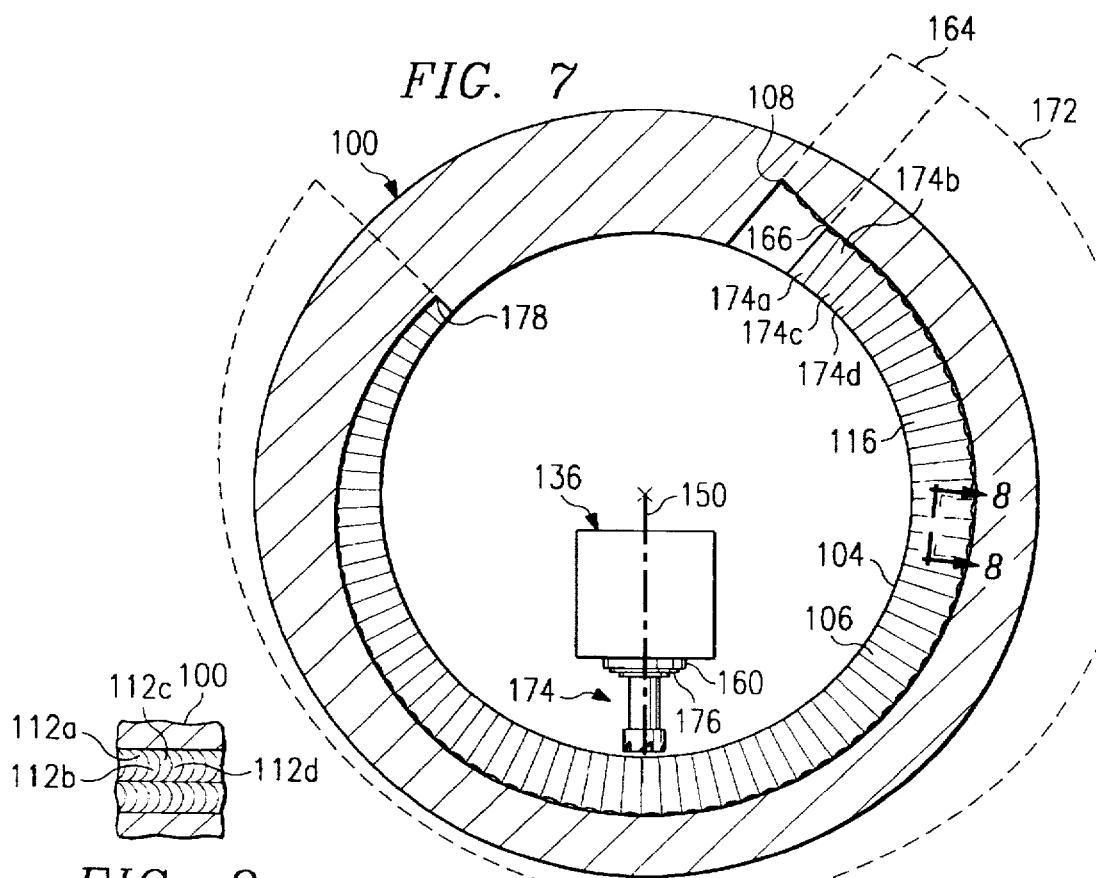
FIG. 7
FIG. 8

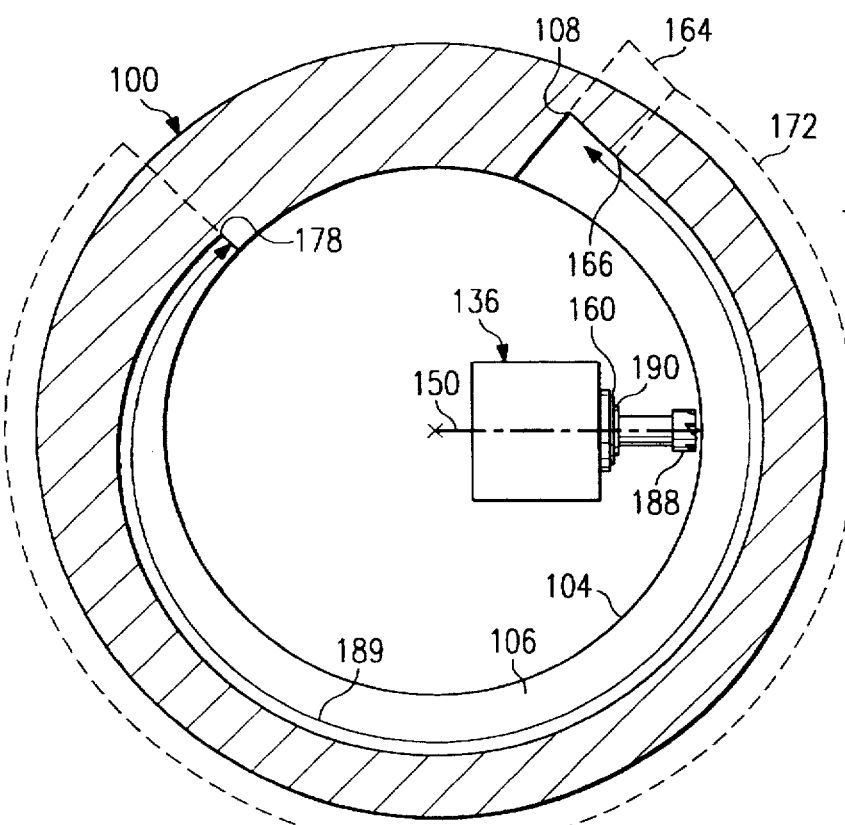
FIG. 11
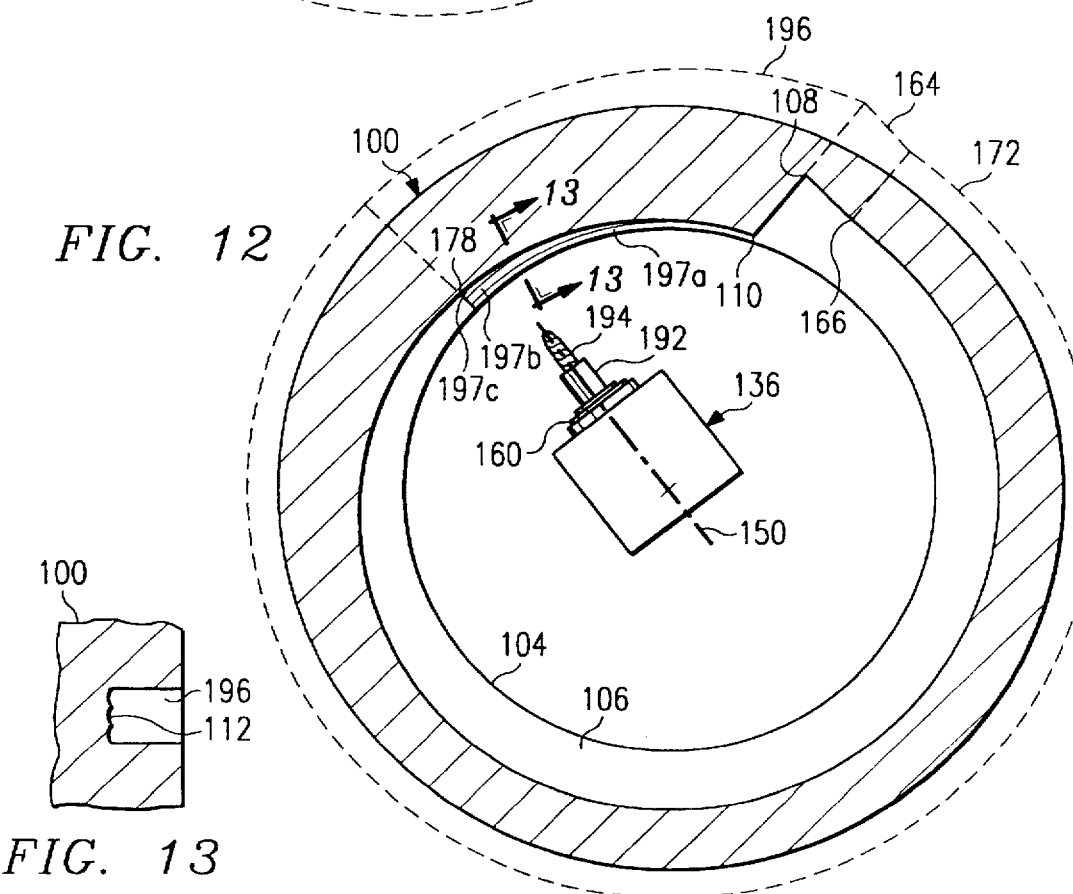
FIG. 12
FIG. 13

FORMING A NONUNIFORM GROOVE IN AN ANNULAR BORE WALL

BACKGROUND OF THE INVENTION

Casings are utilized in a wide variety of commercial applications. One such casing is a centrifugal compressor casing having an annular bore wall. Centrifugal compressors serve to increase the pressure of gases in many applications. Examples of applications for such compressors include compression of natural gas, air, nitrogen, ammonia, etc. To increase the pressure of gases, centrifugal compressor casings have disposed in a bore therethrough a compressor bundle. The compressor bundle includes stationary internal components and a rotor assembly. The rotor assembly includes one or more impellers.

Gas enters the impeller through an inlet section from is a previous stage or from a supply piping system. The gas is compelled radially outward by centrifugal force as the impeller rotates and is thereby compressed. The gas discharged from the impeller enters an annular nonuniform groove disposed within the bore wall of the centrifugal compressor casing near an annular axial lower side wall of the annular nonuniform groove. The gas then collects on an annular radial outer side wall and an annular axial upper side wall of the annular nonuniform groove. This collected gas is transitioned through the annular nonuniform groove by a flux created by the rotation of the impeller. The flux then transitions the gas through the annular nonuniform groove and out a nozzle that has been secured to the radial outer surface of the annular casing. Thus, the annular nonuniform groove in the bore wall of an annular casing allows for increasing the pressure of a gas which enters the annular nonuniform groove from an initial pressure to a higher final pressure. The annular groove increases in cross section in the direction of motion of the impeller and is at its largest cross section as it transitions into the discharge nozzle.

A traditional method of producing a casing having an annular nonuniform groove in the bore wall of the casing involves several time consuming and laborious steps. These steps include the machining of the annular nonuniform groove in four or more separate arcuate sections that are then combined to form the annular nonuniform groove. These arcuate sections are individually placed in a uniform groove much larger than the desired non-uniform groove in the bore wall of the casing and are welded into the uniform groove. As a result of the significant time and labor costs of this traditional method, there is a need in the art for a method that provides an annular nonuniform groove in the bore wall of a casing in an expedient and economically efficient manner.

SUMMARY OF THE INVENTION

The present invention is a method of producing a nonuniform groove in a bore wall of a casing in an expedient and economically efficient manner and an apparatus formed by the resulting grooved casing. The method includes the steps of forming a first portion, forming a second portion, and forming a third portion of an annular nonuniform groove.

The first portion is formed by contacting the bore wall with a first milling tool having a longitudinal axis, rotating the first milling tool about the longitudinal axis of the first milling tool, and asserting the first milling tool radially into the bore wall. The first portion defines a starting point as the radially furthest point on the radial outer surface of the first portion. The first portion also defines a first intermediate point as the radially closest point on the radial outer surface of the first portion.

The second portion is formed by contacting a second milling tool having a longitudinal axis to the bore wall at a point immediately adjacent the first intermediate point, rotating the second milling tool about the longitudinal axis of the second milling tool, and asserting the second milling tool into the bore wall. The second portion is defined along the annular radial outer side wall from the first intermediate point to a second intermediate point. The second intermediate point is defined as the radially closest point on the annular radial outer side wall of the second portion.

The third portion is formed by contacting a third milling tool having a longitudinal axis to the bore wall at a point immediately adjacent to the second intermediate point, rotating the third milling tool about the longitudinal axis of the third milling tool, and asserting the third milling tool into the bore wall. The third portion extends along the annular radial outer side wall of the annular nonuniform groove from the second intermediate point to an ending point.

BRIEF DESCRIPTION OF THE DRAWINGS

FIG. 1 depicts a cross sectional view of a casing with an annular bore wherein an annular nonuniform groove has been formed in accordance with a method of the present invention, taken as a plane perpendicular to the longitudinal axis of the bore such that the plane bisects the produced annular nonuniform groove.

FIG. 2 depicts a cross sectional view taken along line 2—2 of the casing depicted in FIG. 1.

FIG. 4 depicts a milling attachment that forms a part of the apparatus depicted in FIG. 3 wherein the milling attachment has a milling tool rotatably secured thereto.

FIG. 5 depicts a cross sectional view of a casing wherein the bore defines a bore wall having formed therein a first portion in accordance with a step of a method of the present invention taken in a plane perpendicular to the longitudinal axis of the bore such that the plane bisects the first portion.

FIG. 6 depicts a cross sectional view taken along line 6—6 of the annular casing depicted in FIG. 5.

FIG. 7 depicts a cross sectional view of a casing having a bore wherein the bore defines a bore wall having formed therein a second portion of an annular nonuniform groove formed in accordance with a step of a method of the present invention taken as a plane perpendicular to the longitudinal axis of the bore such that the plane bisects the formed second portion of the annular nonuniform groove.

FIG. 8 depicts a cross sectional view taken along line 8—8 of the annular casing depicted in FIG. 7.

FIG. 11 depicts a cross sectional view of a casing having a bore wherein the bore defines a bore wall having formed therein a second portion of an annular nonuniform groove formed in accordance with a step of a method of the present invention taken as a plane perpendicular to the longitudinal axis of the bore such that the plane bisects the formed second portion of the annular nonuniform groove.

FIG. 12 depicts a cross sectional view of a casing having a bore wherein the bore defines a bore wall having formed therein a third portion of an annular nonuniform groove formed in accordance with a step of a method of the present invention taken as a plane perpendicular to the longitudinal axis of the bore such that the plane bisects the formed third portion of the annular nonuniform groove.

FIG. 13 depicts a cross sectional view taken along line 13—13 of the casing depicted in FIG. 12.

DETAILED DESCRIPTION

Figure 3:
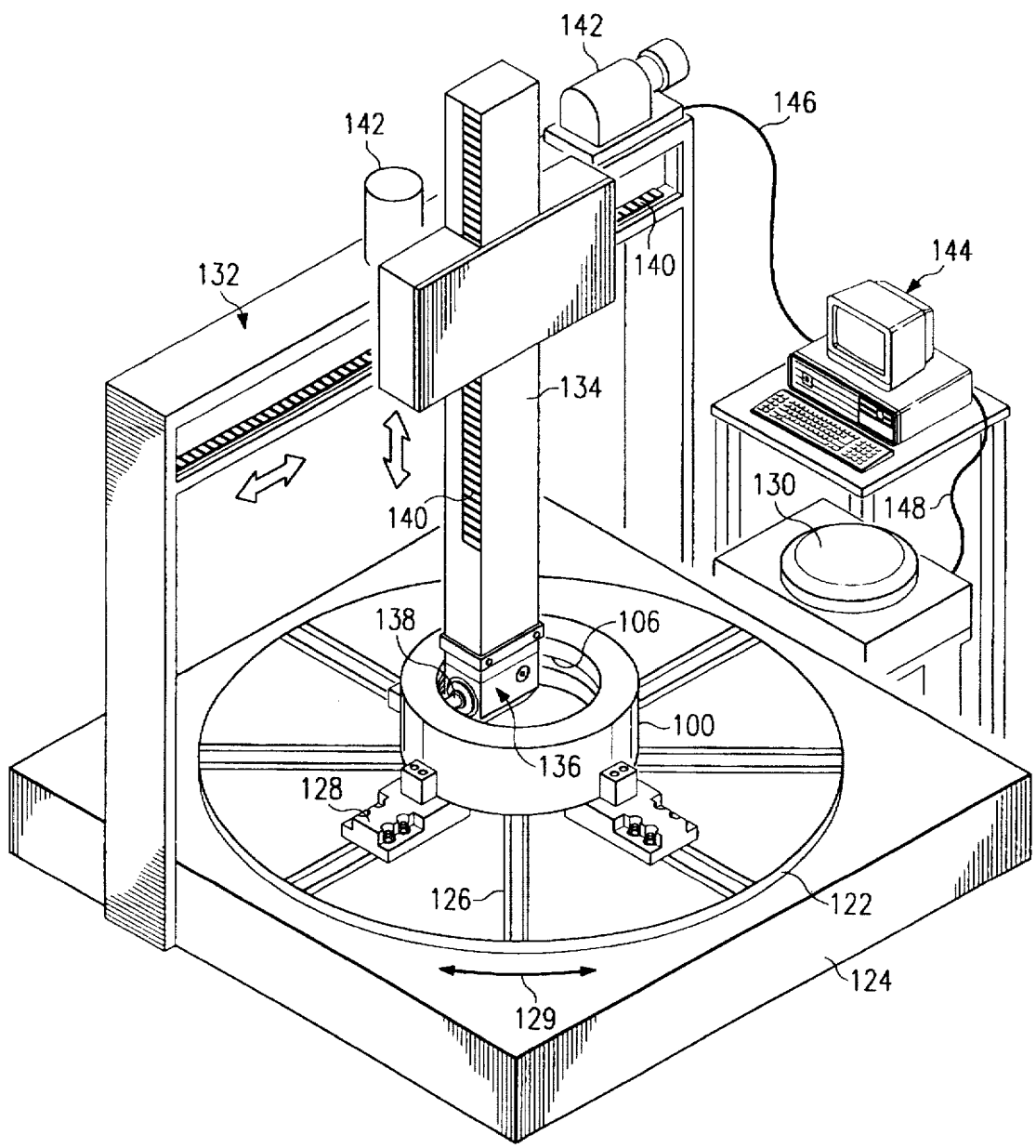
FIG. 3 depicts an apparatus that can be used to perform a method of the present invention.

The present invention is a method that produces an annular nonuniform groove 106 in the bore wall of a casing, e.g. an annular centrifugal compressor casing. The present invention is also an apparatus formed by a casing that has an annular nonuniform groove produced in the bore wall thereof.

FIG. 1 depicts a cross sectional view of a casing 100 having a bore longitudinally disposed therethrough wherein the bore has a longitudinal axis 102. The longitudinally disposed bore defines a bore wall 104 as a radial inner surface of the casing 100 with respect to the longitudinal axis 102 of the bore. The bore wall 104 is circular in a plane perpendicular to the longitudinal axis 102 of the bore. The cross sectional view of the casing 100 in FIG. 1 is taken in a plane perpendicular to the longitudinal axis 102 of the bore that bisects the annular nonuniform groove 106 which is formed by a method of the present invention. Unless otherwise stated, radial directions are directions which are radial to the longitudinal axis 102 of the bore, and axial directions are parallel to the longitudinal axis 102 of the bore. The annular nonuniform groove 106 is disposed within the bore wall 104 and is open to the bore. The annular nonuniform groove 106 is formed within the bore wall 104 from a starting point 108 to an ending point 110.

A typical application is when casing 100 is an annular centrifugal compressor casing which has impellers mounted therein for rotation about the axis 102 to compress gas by radial centrifugal forces. As such, the groove 106 begins at point 110 with a small cross section and gradual increases in cross section to point 108, where the groove transitions into the discharge passage opening through the casing. For example, the groove can start with a minimum cross section that increases to a cross section of about 14" high and 14" deep.

FIG. 2 depicts a cross-sectional view of the casing 100 taken along the line 2—2 in FIG. 1. As shown in FIG. 2, the annular nonuniform groove 106 formed in the casing 100 has an annular radial outer side wall 112, an annular axial upper side wall 114 and an annular axial lower side wall 116. The annular axial upper side wall 114 transitions into the annular radial outer side wall 112 through a radiused corner 118. The annular axial lower side wall 116 transitions into the annular radial outer side wall 112 through a radiused corner 120. The radial distance between the annular radial outer side wall 112 and the bore wall 104 is referred to as the depth of the annular nonuniform groove 106. The axial distance between the annular axial upper side wall 114 and the annular axially lower side wall 116 is referred to as the height of the annular nonuniform groove 106. The length of the annular nonuniform groove 106 is measured along the annular radial outer side wall 112 from the starting point 108 to the ending point 110.

The height and depth of the annular nonuniform groove 106 decreases along the length of the annular nonuniform groove 106 from the starting point 108 to the ending point 110. In one embodiment of the present invention, the ratio of the decrease in the height to the decrease in the depth is preferably about 3:1.

FIG. 3 depicts an apparatus that can be used to perform a method of the present invention. As shown in FIG. 3, the casing 100 is secured to a rotatable table 122 that can rotate the casing 100 about the longitudinal axis 102. The rotatable table 122 is supported by and can rotate with respect to the table support 124 which remains in a stationary position during rotation of the rotatable table 122. The rotatable table 122 includes a plurality of tracks 126 through which slide a plurality of adjustable chucks 128. The adjustable chucks 128 secure and position the casing 100 with respect to the rotatable table 122. As indicated by the arrow 129, the rotatable table 122 can rotate the casing 100 about the longitudinal axis 102 in either a clockwise or counterclockwise direction as viewed. The rotation of the rotatable table 122 is controlled by a motor 130.

A machine tool 132 supports and positions a ram 134. The ram 134 has connected thereto a ram attachment 136 which can be any right angle milling attachment or a universal milling attachment. The ram attachment 136 has a milling tool 138 rotatably secured therein. The ram attachment 136 allows the milling tool 138 to form the nonuniform groove 106 into the bore wall 104 of the casing 100. The axial and radial position of the milling tool 138 relative to the bore wall 104 and axis 102 is varied by the machine tool 132. The machine tool 132 includes a crossslide 140 along which the ram 134 can move so as to alter the radial position of the milling tool 138 relative to the bore wall 104. The machine tool 132 can also adjust the axial position of the milling tool 138 relative to the bore wall 104. The alteration of the axial and radial position of the milling tool 138 relative to the bore wall 104 is controlled by motors 142.

The motor 130 that controls the rotation of the rotatable table 122 and the motor 142 that controls the axial and radial position of the milling tool 138 relative to the bore wall 104 of the casing 100 are both preferably controlled by a computer numerically control ("CNC") unit 144. The CNC unit 144 is connected in electrical communication with the motor 142 by the wires 146. The CNC unit is connected in electrical communication with the motor 130 by the wires 148. A suitable CNC unit 144 can be obtained from GE Fanuc Automation of Charlottesville, Va. or other CNC control manufacturers. The use of the CNC unit 144 provides for accurate relative positioning of the milling tool 138 with respect to the bore wall 104 of the casing 100. The CNC unit 144 is controlled by piecepart operating software. The piecepart operating software is typically prepared by an NC programer from a blue print of the desired annular casing. Thus, a separate operating software may be generated for each desired groove 106. Camax Programing Software may be used to generate the desired piecepart operating software.

The machine tool 132 can be a single column compact design, a double column design, or a portal type design with movable base. The rotatable table 122 can be a standard turntable, a table having power operated chucks and fixtures, or a pelletizing system. A tool changing system (not shown) can be included, such as a disc type tool magazine, a chain type tool magazine, or a WERO tool changing system. (These alternative lathes, rotatable tables, and tool changing systems are all available from Dorries Scharmann of Carol Stream, Ill.).

Thus, a CNC controlled apparatus, such as depicted in FIG. 3, provides an example of an apparatus that can be utilized to perform a method of the present invention and that can be used to produce a casing with a nonuniform groove 106 in accordance with the present invention.

FIG. 4 depicts the ram attachment 136 having the milling tool 138 rotatably secured therein. The ram attachment 136 can rotate the milling tool 138 about the axis 150. The ram attachment 136 can be secured to the ram 134 by several means one of which is a plurality of bolts (not shown) extending through the bores 152 in the ram attachment 136. The ram attachment 136 is operably secured to the ram 134 through the spindle 154 such that operation of the ram serves to rotate the milling tool 138 about the axis 150. The milling tool 138 has a face 156 that is the radial outer surface of the milling tool 138 with respect to the axis 150. The milling tool 138 also has an end 158 that is axially disposed away from the ram attachment 136 with respect to the axis 150.

The milling tool 138 is rotated about the axis 150 by the spindle 160 that can rotatably secure different milling tools. The spindle 160 rotatably secures a rotary tool holder 162 that holds the milling tool 138. The rotary tool holder 162 can differ depending on the type of milling tool desired to be rotatably secured by the spindle 160.

The method of the present invention of forming the annular nonuniform groove 106 in the bore wall 104 of the casing 100 involves several steps. These steps include forming a first portion which is connected to the exhaust port, forming a second portion of relatively large cross section, and forming a third portion of relatively small cross-section.

FIG. 5 depicts the casing 100 having the ram attachment 136 disposed within the bore so as to be radially positioned within the bore wall 104. As in FIG. 5, the remaining FIGS. do not depict the remainder of the apparatus depicted in FIG. 3 for the sake of clarity.

Forming A First Portion Of The Annular Nonuniform Groove

FIG. 5 depicts the formation of a first portion 164 in accordance with the method of the present invention. The first portion 164 is formed in the bore wall 104 of the casing 100 using a milling tool 168 that is attached to the ram attachment 136. The milling tool 168 can be any milling tool, including a drill. Preferred milling tools 168 include RPF full radius high-shear cavity, die and face mills (such as those available from Kennametal Inc., Raleigh, N.C., catalog numbers right hand KISR-1.39-LF3.5-4, KSSR-1.39-LF3.5-3, each of two inch diameter and KSSR-2.39-LF3.5-4 of three inch diameter as listed in a Kennametal publication A93-28(40)D3 entitled "RPF High Shear Cavity and Die Mills").

The milling tool 168 is rotatable about the longitudinal axis 150 of the milling tool 168. The milling tool 168 is rotatably secured within the spindle 160 by a rotary tool holder 170. The preferred rotary tool holder 170 is a shell mill holder.

To form the first portion 164 in the bore wall 104, the milling tool 168 is rotated and moved into contact with the bore wall 104 to initiate metal removal. As milling proceeds, tool 168 is asserted radially into the bore wall 104. The first portion 164 can be formed by plunging or ramping the milling tool 168 radially into the bore wall 104. Ramping refers to the assertion of a milling tool radially into the bore wall 104 while simultaneously the relative position of the bore wall 104 is altered with respect to the milling tool being inserted therein. Plunging refers to the assertion of a milling tool radially into the bore wall 104 while the relative positions of the bore wall 104 and the milling tool being asserted therein remain fixed.

The resulting first portion 164 defines the starting point 108 as the radially furthest point from the longitudinal axis 102 on the annular radial outer side wall 112 of the resulting first portion 164 of the annular nonuniform groove 106. The resulting first portion 164 also defines a first intermediate point 166 as the radial closest point from the longitudinal axis 102 on the annular radially outer side wall 112 of the resulting first portion 164 of the annular nonuniform groove 106.

Figure 14:
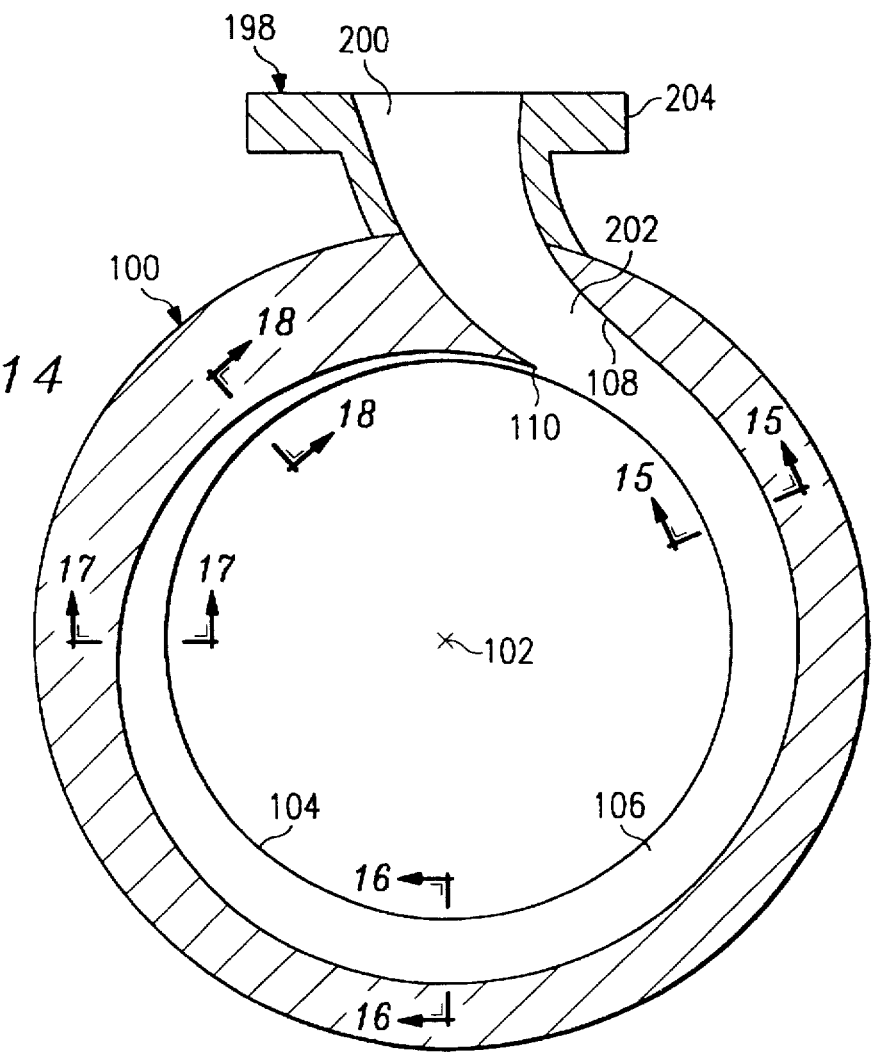
FIG. 14 depicts a cross sectional view of a casing having a bore wherein the bore defines a bore wall having formed therein an annular nonuniform groove formed in accordance with a step of a method of the present invention taken as a plane perpendicular to the longitudinal axis of the bore such that the plane bisects the formed annular nonuniform groove.

The point 108 is determined by the position of the exhaust port 202 through the casing 100 as seen in FIG. 14. A flange 204 is secured to the exterior of the casing which has a passage 200 forming a continuation of the passage 202. The point 166 is chosen to coincide with the beginning of the second portion as described hereafter. It should be noted that the axis 150 does not intersect axis 102 to form the first portion 164. Instead, the axis 150 is offset from axis 102 to provide the difference in radial distance of points 108 and 166 from the axis 102.

Preferably, the first portion 164 is formed by plunging or ramping the milling tool 168 into the bore wall 104 to a radial depth of about ¼ to initiate the first portion 164. Also preferably, and as shown in FIG. 6, which is taken along the line 6—6 of FIG. 5, the first portion 164 is formed by moving the milling tool 168 in a rectangular path, such as the one depicted by the arrow.

This step may not provide a desired smoothness of the annular radial outer side wall 112, the annular axial upper side wall 114, and the annular axial lower side wall 116 of the resulting first portion 164 of the annular nonuniform groove 106. That is, some finishing stock may remain on the annular radial outer side wall 112, the annular axial upper side wall 114, and the annular axial lower side wall 116 of the resulting first portion 164 of the annular nonuniform groove 106.

Forming A Second Portion Of The Annular Nonuniform Groove

Figure 9:
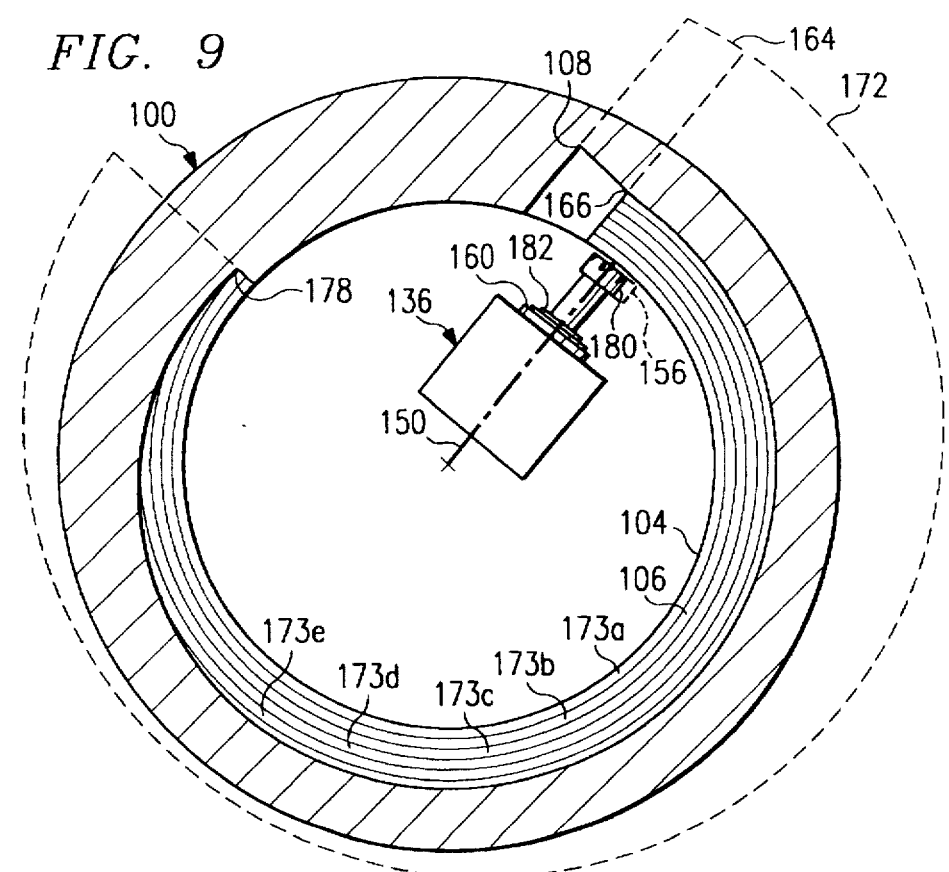
FIG. 9 depicts a cross sectional view of a casing having a bore defining a bore wall having formed therein a second portion of an annular nonuniform groove formed in accordance with a step of a method of the present invention taken as a plane perpendicular to the longitudinal axis of the bore such that the plane bisects the formed second portion of the annular nonuniform groove.

FIGS. 7 and 9 depict alternative methods for forming a second portion 172 of relatively large cross section of the annular nonuniform groove 106. The second portion 172 of the annular nonuniform groove 106 can be formed by plunge milling, by shell milling, or by a combination thereof.

FIG. 7 depicts the formation of a second portion 172 of the annular nonuniform groove 106 by plunge milling using a plunge milling tool 174. The radial lines 174a–d depicted in the second portion 172 represent the radial portions of the second portion 172 that are sequentially formed using the plunge milling tool 174 on lower side wall 116 and upper side wall 114. The plunge milling tool 174 is rotatably secured within the spindle 160 by a rotary tool holder 176. The preferred rotary tool holder 176 is a shell mill holder. The second portion 172 is formed from the first intermediate point 166 along the annular radial outer side wall 112 to a second intermediate point 178.

To form the second portion 172 of the annular nonuniform groove 106 using the plunge milling tool 174, the plunge milling tool 174 is contacted to the bore wall 104, rotated about the longitudinal axis 150, and asserted radially into the bore wall 104 of casing 100. After the plunge milling tool 174 has formed a first radial portion 174a of the second portion 172 of the annular nonuniform groove 106 to a desired depth, the plunge milling tool 174 is then retracted radially away from the bore wall 104. The casing 100 can then be indexed about axis 102 such that a subsequent radially outward movement of the plunge milling tool 174 forms a second radial portion 174b of the second portion 172 of the annular nonuniform groove 106. The term "indexed" refers to the rotation of the casing 100 about the longitudinal axis 102 so as to alter the relative position of the bore wall 104 with respect to the plunge milling tool 174. Alternatively, the relative position of the plunge milling tool 174 and the bore wall 104 can be altered by repositioning the ram 134 using the machine tool 132.

Preferably the second radial portion 174b of the second portion 172 is formed immediately adjacent the first radial portion 174a of the second portion 172. Subsequent radial portions (e.g., 174c, 174d, etc.) can then be formed until a first pass of the plunge milling tool 174 has been completed. A "pass" refers to the path of the plunge milling tool 174 as it forms a series of radial cuts to form a portion of the second portion 172 in the bore wall 104 as measured from the first intermediate point 166 to the second intermediate point 178. Typically, each pass of the plunge milling tool 174 forms a portion of the second portion 172 of the annular nonuniform groove 106 that has a height of about 1½" where the milling tool has a 1½" diameter. Thus, several passes of the plunge milling tool 174 may be required to be performed axially adjacent a first pass if a desired height of the second portion 172 of the annular nonuniform groove 106 exceeds about 1½". As the milling tool 174 transitions from point 166 to point 178, both the depth and the height of the radial cuts steadily decreases, causing the cross-sectional area to decrease. When starting from point 166, depending on the diameter of the milling tool 174 and the height of the groove, two or even more passes may be necessary at different axial positions to open the groove to its full height. As the milling tool 174 approaches point 178, the height may have decreased to just the diameter of milling tool 174, in which case only a single pass is needed, or the height at point 178 may be somewhat larger than the diameter of the milling tool, wherein multiple, partially overlapping passes will be needed.

This step may not provide a desired smoothness of the annular radial outer side wall 112, the annular axial upper side wall 114, and the annular axial lower side wall 116 of the resulting portion of the annular nonuniform groove 106. That is, some finishing stock may remain on the annular radial outer side wall 112, the annular axial upper side wall 114, and the annular axial lower side wall 116 of the resulting portion of the annular nonuniform groove 106. For example, FIG. 8 depicts finishing stock 112a, 112b, 112c, 112d, etc. that remains on the annular radial outer side wall 112 of a portion of the second portion 172 of the annular nonuniform groove 106.

The plunge milling tool 174 can be the "ramp, plunge and feed" type milling tool or the "plunge-only" type milling tool. The preferred "plunge-only" type plunge milling tools 174 are available from Ingersoll Cutting Tool Company, Rockford, Ill. (e.g., the Shank Type having a cutter number CHA15581R01 (1½ inch diameter), the Shell Mill Style having cutter numbers CHA20157R02 (2" diameter), CHA30257R02 (3" diameter), and CHA40158R01 (4" diameter) as listed in an Ingersoll publication C-5635 entitled "Plunge Milling Cutters").

As shown in FIG. 9, shell milling using a shell milling tool 180 is provided as an alternative to plunge milling using the plunge milling tool 174 shown in FIG. 7 to form the second portion 172 from the first intermediate point 166 to the second intermediate point 178. The lines 173a, 173b, 173c, 173d, etc., depicted in the second portion 172 denote the radial portions that are formed sequentially by the shell milling tool 180. These lines approximate circles which are concentric with the bore. wall 104. Preferred shell milling tools 180 include those available from Ingersoll Cutting Tool Company (e.g., cutter numbers 2J6B02R01 (2" diameter), 2J6B02R25 (2½" diameter), 2J6B03R01 (3 diameter), and 2J6B04R01 (4 diameter) as listed in an Ingersoll publication C-C590-5 entitled "High Positive Milling Cutters"). The shell milling tool 180 is rotatably secured within the spindle 160 by a rotary tool holder 182. The preferred rotary tool holder 182 is a shell mill holder.

To form the second portion 172 of the annular nonuniform groove, the shell milling tool 180 is positioned within the first portion 164 at a desired depth of cut and the shell milling tool 180 is rotated about the longitudinal axis 150. Then the casing 100 is rotated about the longitudinal axis 102 such that the bore wall 104 is rotated into the shell milling tool 180 at a desired feed rate to remove a portion of the material between the first intermediate point 166 and the second intermediate point 178. As a result, the shell milling tool 180 contacts the casing 100 on the face 156 of the shell milling tool 180. This method can be repeated to form the second portion 172 of the annular nonuniform groove 106 from the first intermediate point 166 to the second intermediate point 178. As the lines 173a, 173b, 173c, etc., move radially outward from the immediately previous line, the lines are shortened slightly to insure the desired variation of cross section in groove 106. Thus, the degree of rotation of the casing 100 decreases as each line is formed.

This method may also not provide a desired smoothness of the annular radial outer side wall 112, the annular axial upper side wall 114, and the annular axial lower side wall 116 of the second portion 172 of the annular nonuniform groove 106. That is, finishing stock may remain on the annular radial outer side wall 112, the annular axial upper side wall 114, and the annular axially lower side wall 116 of the second portion 172 of the annular nonuniform groove 106.

The position of the second intermediate point 178 along the length of the annular nonuniform groove 106 is determined by either the size of the plunge milling tool 174 or the size of the shell milling tool 180. Clearly, the height of the groove cannot be less than the diameter of these tools in the second portion. The smaller the size of the shell milling tool 180, the further the intermediate point 178 can be extended along the length of the annular nonuniform groove 106 from the starting point 108.

Finish Milling The Annular Axial Side walls

Figure 10:
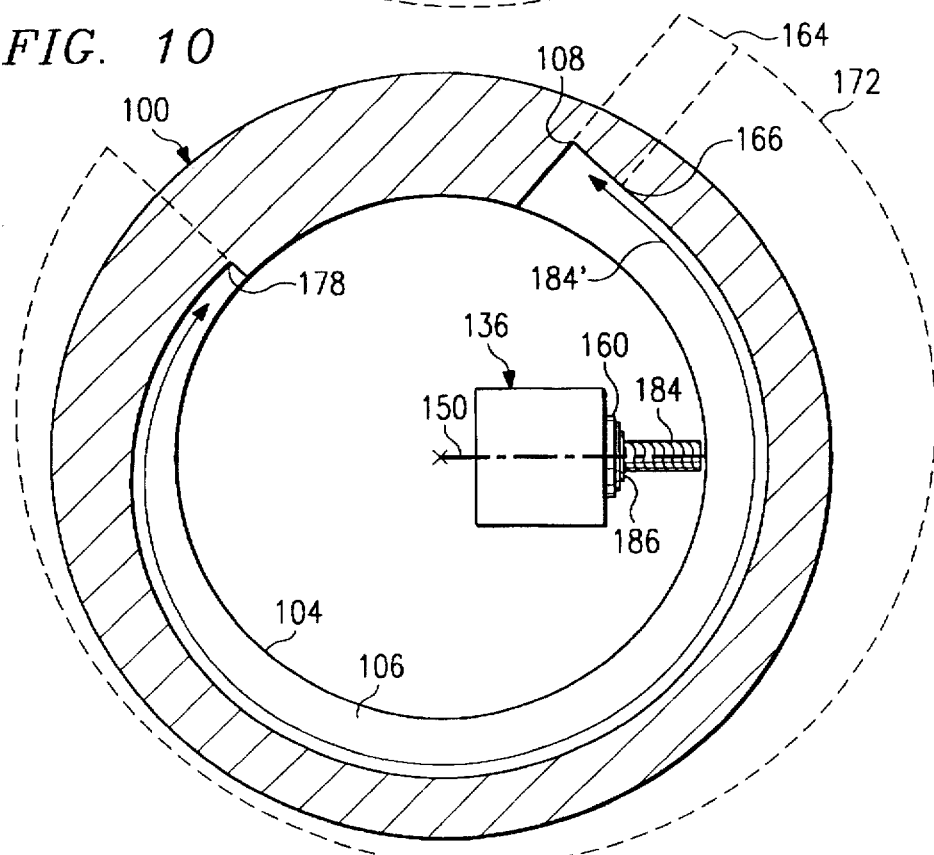
FIG. 10 depicts a cross sectional view of a casing having a bore wherein the bore defines a bore wall having formed therein a second portion of an annular nonuniform groove formed in accordance with a step of a method of the present invention taken as a plane perpendicular to the longitudinal axis of the bore such that the plane bisects the formed second portion of the annular nonuniform groove.

As indicated above, depending on the desired finish of the annular nonuniform groove 106, it may be necessary to finish mill the annular axial upper side wall 114 and the annular axial lower side wall 116 to remove any remaining finishing stock. FIG. 10 depicts the finish milling of the annular axial upper side wall 114 and the annular axial lower side wall 116 using a milling tool 184. The milling tool 184 can be either a helical end mill or an over cut shell mill. The milling tool 184 is rotatably secured within the spindle 160 by a rotary tool holder 186. The preferred rotary tool holder 186 is an endmill holder. The annular axial upper side wall 114 and the annular axial lower side wall 116 are both finished milled from the starting point 108 to the second intermediate point 178.

The milling tool 184 can be fed into either the annular axial upper side wall 114 or the annular axially lower side wall 116, then the casing 100 can be rotated while the milling tool 184 follows the annular radial outer side wall 112 of the annular nonuniform groove 106 as depicted by the arrow 184'. This method can then be repeated for the other side wall. When helical end mills are used, each side wall can usually be finish milled in one (1) pass. When over cut shell mills are used, each side wall may require multiple passes to be finish milled. A preferred over cut shell milling tool 188 is available from Ingersoll Cutting Tools Inc. (e.g., an Extended Length R.H. Helix End Mill cutter number 43C200582R0001 (2" diameter) as listed in an Ingersoll publication C-C579-2 entitled "Brazed Carbide Endmills for Finishing"). Also, a plunge only type tool 174 as discussed above could be used.

Finish Milling The Annular Radial Outer Side Wall

As indicated above, depending on the desired finish of the annular nonuniform groove 106, it may be necessary to finish mill the annular radial outer side wall 112 of the annular nonuniform groove 106 in second portion 172 to remove any remaining finishing stock. FIG. 11 depicts the finish milling of the annular radial outer side wall 112 of the annular nonuniform groove 106 using an over cut shell milling tool 188 having radiused corners. The over cut shell milling tool 188 is rotatably secured within the spindle 160 by a rotary tool holder 190. The preferred rotary tool holder 190 is a shell mill holder. The annular radial outer side wall 112 of the annular nonuniform groove 106 is machined between the starting point 108 and the second intermediate point 178. The over cut shell milling tool 188 can be either a typical helical shell mill (high speed steel or carbide), or an indexable type of shell mill with radiused inserts. The corner radius of the over cut shell milling tool 188 can be equal to or smaller than the corner radii 118 and 120 in the annular nonuniform groove 106. Multiple passes may be required to machine the annular radial outer side wall 112. A preferred over cut shell milling tool 188 is a 2" diameter over cut shell mill available from Ingersoll Cutting Tools Inc. (e.g., a Shell Style tool having cutter numbers 5W6H02R01 (2" diameter), 5W6H02R02 (2½" diameter), and 5W6H03R01 (3" diameter) as listed in an Ingersoll publication C-S631-1 entitled "Ingersoll Heavy Duty -Button Mills"). During the machining method, the casing 100 rotates about the longitudinal axis 102 while the over cut shell milling tool 188 follows the annular radial outer side wall 112 of the annular nonuniform groove 106 as depicted by the arrow 189.

Forming A Third Portion Of The Annular Nonuniform Groove

As shown in FIG. 12, a third portion 196 of the annular nonuniform groove 106, as defined between the second intermediate point 178 and the ending point 110, is formed with a ball nose end milling tool 194. The lines 197a, 197b, 197c depicted within the portion 196 denote the radial portions sequentially formed by the ball nose end milling tool 194. The ball nose end milling tool 194 can be either a helical type or an indexable type. The ball nose end milling tool 194 is rotatably secured within the spindle 160 by a rotary tool holder 192. The preferred rotary tool holder 192 is an endmill holder. A preferred ball nose end mill 194 of the indexable type is available from Ingersoll Cutting Tools, Inc. (such as an extended length ball nose having cutter numbers 16W1X0780R07 (¾ diameter), 16W1B1080R15 (1" diameter), and 16W1B1081R05 (1" diameter) as listed on page 43 of an Ingersoll publication C-C570-1 entitled "Indexable End Mills"). Multiple passes are used to form the third portion 196 of the annular nonuniform groove 106. Again, the lines 197a, 197b, 197c are formed by rotating casing 100 relative tool 194 about axis 102 or moving tool 194 about axis 102 relative to the casing 100. Each line 197a, 197b and 197c covers a decreasing arc of the third portion to allow the cross-section variation of the groove. As shown in FIG. 13, the annular radial outer side wall 112 in the third portion 196 can have a scalloped finish created by the ball nose end mill 194. The height of the scallops varies based on the machining requirements for the particle annular nonuniform groove 106.

Figure 18:
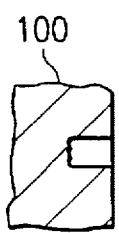
FIG. 18 depicts a cross sectional view taken along line 18—18 of the annular casing depicted in FIG. 14.
Figure 15:
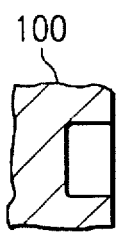
FIG. 15 depicts a cross sectional view taken along line 15—15 of the annular casing depicted in FIG. 14.
Figure 17:
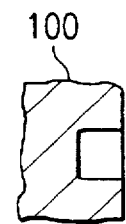
FIG. 17 depicts a cross sectional view taken along line 17—17 of the annular casing depicted in FIG. 14.
Figure 16:
FIG. 16 depicts a cross sectional view taken along line 16—16 of the annular casing depicted in FIG. 14.

FIG. 14 depicts the casing 100 having formed therein the nonuniform groove 106 extending along the bore wall 104 from the starting point 108 to the ending point 110. Also depicted on the radial outer surface of the annular casing 100 is a nozzle 198 secured thereto. The nozzle 198 has the bore 200 that is connected to the nonuniform groove 106 by a passageway 202 that has been machined in the casing 100. FIG. 15 depicts a portion of the casing depicted in FIG. 14 taken about the line 15—15 in FIG. 14. FIG. 16 depicts a portion of the annular casing depicted in FIG. 14 taken about the line 16—16 in FIG. 14. FIG. 17 depicts a portion of the annular casing depicted in FIG. 14 taken about the line 17—17 in FIG. 14. FIG. 18 depicts a portion of the annular casing depicted in FIG. 14 taken about the line 18—18 in FIG. 14.

Although a preferred embodiment of the invention has been described in the foregoing detailed description and depicted in the accompanying drawings, it will be understood that the invention is not limited to the embodiment disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the spirit and scope of the invention.

That which I claim:

1. A method of forming a circumferentially extending nonuniform groove in an annular wall of a bore in a casing, said bore having a longitudinal axis, said nonuniform groove having, with respect to said longitudinal axis, an annular radial outer side wall, an annular axial upper side wall, and an annular axial lower side wall, said method comprising the steps of:

contacting said annular wall with a first milling tool having a longitudinal axis;

rotating said first milling tool about the longitudinal axis of said first milling tool;

asserting said first milling tool radially into said bore wall to form a first portion of said annular nonuniform groove, said first portion defining a starting point as the radially furthest point on the radial outer surface of said first portion and defining a first intermediate point as the radially closest point of the radial outer surface of said first portion;

contacting a second milling tool having a longitudinal axis to said bore wall at a point immediately adjacent said first intermediate point;

rotating said second milling tool about said longitudinal axis of said second milling tool;

asserting said second milling tool into said bore wall to form a second portion of said annular nonuniform groove, said second portion being defined along said annular radial outer side wall from said first intermediate point to a second intermediate point, said second intermediate point being defined as the radially closest point on said annular radial outer side wall of said second portion;

contacting a third milling tool having a longitudinal axis to said bore wall at a point immediately adjacent to said second intermediate point;

rotating said third milling tool about said longitudinal axis of said third milling tool; and, asserting said third milling tool into said bore wall to form a third portion of said annular nonuniform groove, said third portion extending along said annular radial outer side wall of said annular nonuniform groove from said second intermediate point to an ending point.

2. The method of claim 1 wherein the formed annular nonuniform groove decreases in both height and depth along the length of said annular nonuniform groove.

3. The method of claim 2 wherein the ratio of the decrease in the height to the decrease in the depth is about 3:1.

4. The method of claim 1 wherein said first portion is formed by plunging said milling tool radially into said bore wall.

5. The method of claim 1 wherein said first milling tool is asserted radially into said annular casing in a rectangular pattern that increases in radial distance from said longitudinal axis of said annular casing to form said first portion.

6. The method of claim 1 wherein said first portion is formed by ramping said milling tool radially into said bore wall.

7. The method of claim 1 wherein said first milling tool is a face mill.

8. The method of claim 1 wherein said second milling tool is a plunge milling tool.

9. The method of claim 8 further comprising the following steps:

plunging said plunge milling tool radially into said bore wall to form a portion of said second portion of said annular nonuniform groove;

retracting said plunge milling tool radially from said bore wall; and, indexing said annular casing.

10. The method of claim 9 wherein the plunging, retracting and indexing steps are repeated until said second portion of said annular nonuniform groove portion is formed.

11. The method of claim 9 wherein the step of indexing said annular casing is performed by rotating said annular casing about said longitudinal axis of said annular casing.

12. The method of claim 8 wherein said plunge milling tool is a ramp, plunge and feed type milling tool.

13. The method of claim 8 wherein said plunge milling tool is a plunge-only type milling tool.

14. The method of claim 1 wherein said second milling tool is a shell milling tool.

15. The method of claim 14 wherein said second portion said annular nonuniform groove is formed by further producing rotation of said annular casing about said longitudinal axis of said annular casing.

16. The method of claim 1 wherein said third milling tool is a ball nose end mill.

17. The method of claim 16 wherein said ball nose end mill is selected from the group consisting of a helical type ball nose end mill or an indexable type ball nose end mill.

18. The method of claim 1 wherein said step of asserting said third milling tool into said bore wall further comprises asserting said third milling tool radially into said bore wall.

19. The method of claim 1 wherein said step of asserting said third milling tool into said bore wall further comprises producing rotation of said annular casing about said longitudinal axis of said bore.

20. The method of claim 1 wherein said step of asserting said third milling tool into said bore wall further comprises:

asserting said third milling tool into said formed second portion of said annular nonuniform groove; and, producing rotation of said annular casing about said longitudinal axis of said bore.

21. The method of claim 1 further comprising the following steps:

contacting a fourth milling tool having a longitudinal axis with said annular axial upper side wall of said second portion;

rotating said fourth milling tool about said longitudinal axis of said fourth milling tool;

asserting said fourth milling tool axially into said annular axial upper side wall;

producing rotation of said annular casing about said longitudinal axis of said annular casing to finish mill said annular axial upper side wall;

contacting said fourth milling tool having a longitudinal axis with said annular axial lower side wall of said second portion;

rotating said fourth milling tool about said longitudinal axis of said fourth milling tool axially into said annular axial lower side wall;

producing rotation of said annular casing about said longitudinal axis of said annular casing to finish mill said annular axial lower side wall;

contacting a fifth milling tool having a longitudinal axis with said annular radial outer side wall of said second portion;

rotating said fifth milling tool about said longitudinal axis of said fifth milling tool;

asserting said fifth milling tool radially into said annular radial outer side wall ;and producing rotation of said annular casing about said longitudinal axis of said annular casing to finish mill said annular radial outer side wall of said second portion.

22. The method of claim 1 wherein the fourth milling tool is selected from the group consisting of a helical end mill and an over cut shell mill.

23. The method of claim 21 wherein said fifth milling tool is an over cut shell milling tool having radiused corners.

24. The annular casing produced by the method of claim 1.

* * * * *